United States Patent [19]

Chagnon et al.

[11] 4,374,809
[45] Feb. 22, 1983

[54] PROCESS FOR THE SEPARATION OF MOLYBDENUM VALUES FROM TUNGSTEN VALUES

[75] Inventors: Mark S. Chagnon, Lowell, Mass.; Joseph E. Lester, Gibsonia, Pa.; Samuel Natansohn, Sharon, Mass.

[73] Assignee: GTE Laboratories Incorporated, Waltham, Mass.

[21] Appl. No.: 311,838

[22] Filed: Oct. 16, 1981

[51] Int. Cl.$^3$ .................. C01G 39/00; C01G 41/00
[52] U.S. Cl. ............................ 423/54; 75/101 BE; 423/DIG. 14; 423/658.5
[58] Field of Search .............. 423/54, DIG. 14, 658.5; 75/101 BE

[56] References Cited

U.S. PATENT DOCUMENTS 4,226,791  10/1980  Reinhardt et al. .................... 423/54
4,279,870   7/1981  Natansohn et al. ................... 423/54
4,287,159   9/1981  Natansohn et al. ................... 423/54

OTHER PUBLICATIONS

Wells et al., "Analyst", vol. 72, 1947, pp. 185-188.

*Primary Examiner*—Herbert T. Carter
*Attorney, Agent, or Firm*—Ivan L. Ericson

[57] ABSTRACT

Molybdenum is removed from an aqueous solution containing tungsten and molybdenum by extracting the molybdenum from the aqueous solution having a pH greater than 8.5 with a liquid organic extractant containing a preferred complexing agent, 3,4-dimercaptotoluene.

18 Claims, No Drawings

PROCESS FOR THE SEPARATION OF MOLYBDENUM VALUES FROM TUNGSTEN VALUES

FIELD OF THE INVENTION

This invention relates to a process of separating molybdenum values from tungsten values. More particularly, it is concerned with a process of separating molybdenum values from tungsten values using an organic extractant containing a mercaptoaromatic complexing agent.

BACKGROUND OF THE INVENTION

Tungsten ores, such as scheelite or wolframite, used for the production of tungsten and tungsten chemicals invariably contain several weight percent (w/o) of molybdenum. The presence of molybdenum in the final product is undesirable because many exacting applications of tungsten metal and tungsten chemicals require materials of high purity; the molybdenum impurity affects such materials deleteriously. However, the separation of molybdenum from tungsten is very difficult because these two elements have analogous outer shell electronic configurations and, therefore, their chemical properties are very similar.

The prevalent commercial method of processing of tungsten ore or tungsten ore concentrate consists of the digestion of the feedstock in strong alkali such as sodium hydroxide. The removal of the molybdenum impurity is accomplished by the precipitation of the molybdenum sulfide which requires the addition of sulfide ion and acidification of the process stream to a pH of 3. This method has the disadvantage of generating large amounts of a sludge precipitate which is difficult to reprocess or to dispose of. The technique results in a significant loss of tungsten because a comparable weight of tungsten is either entrapped or co-precipitated during the molybdenum sulfide precipitation. In addition, the operation involves the use of environmentally objectionable sulfide compounds (the generation of hydrogen sulfide is unavoidable) and large amounts of acid.

OBJECTS OF THE INVENTION

Accordingly, it is an object of the present invention to provide a process for the separation of molybdenum values from tungsten values in aqueous solutions.

It is a further object of this invention to provide a process which is useful in alkaline media to a pH greater than 8.5.

Further and other objects of the present invention will become apparent from the description contained herein.

SUMMARY OF THE INVENTION

In accordance with one aspect of the present invention, there is provided a process for removing molybdenum values from an aqueous solution containing tungsten and molybdenum values at a pH greater than 8.5. The molybdenum values are selectively removed by contacting the aqueous solution containing the molybdenum and tungsten values with an organic extractant which contains a mercaptoaromatic complexing agent having two mercapto groups at ortho positions to each other, and an organic solvent.

DETAILED DESCRIPTION OF THE PREFERRED EMBODIMENTS

For a better understanding of the present invention, together with other and further objects, advantages and capabilities thereof, reference is made to the following disclosure and appended claims.

The present invention is based on the fact that at a pH of greater than 8.5 the molybdate ion $MoO_4^{2-}$ forms a complex with 3,4-dimercaptotoluene (3,4-DMT) whereas the tungstate ion $WO_4^{2-}$ does not. This difference can be used to separate molybdenum from tungstate in a tungsten ore processing stream by adding sufficient 3,4-dimercaptotoluene complexing agent to complex all of the molybdenum and then extracting the complex into an organic phase leaving the uncomplexed tungsten in the aqueous process stream. This method is particularly advantageous at a pH of about 9.5, which is the approximate pH of the typical tungsten ore processing stream following a treatment to remove silica. Thus, no further acidification is required to effect the molybdenum removal nor is there any hydrogen sulfide generated.

That 3,4-dimercaptotoluene forms a complex with molybdate ion but not with tungstate ion at a pH of greater than about 8.5 was unexpected because at a somewhat lower pH; namely, about 8.0, both these ions form complexes with 3,4-dimercaptotoluene so that separation of the two ions is not feasible at lower pH by this technique. Furthermore, in an exhaustive study of the analogous dihydroxyaromatic ligands of the general formula $R.C_6H_3(OH)_2$ where R represents various functional group substituents such as methyl (both 2,3 and 3,4), hydroxyl, chloro, nitro, carboxyl, formyl, and phenyl, it was found invariably that both tungstate and molybdate ions formed complexes with these ligands. It was also found that in all ligands evaluated, the stability constants of the tungstate complexes are 1–2 orders of magnitude larger than those of the molybdate ones. The reverse, however, is true in the case of the complexes of 3,4-dimercaptotoluene with tungstate or molybdate ions at a pH of about 8.0 where both are stable; the stability constants of the molybdate 3,4-dimercaptotoluene complex is approximately 20 times that of the tungstate.

Compounds such as dimercaptobenzene, trimercaptobenzene, chloro-dimercaptobenzene, nitro-dimercaptobenzene, dimercaptobenzoic acid, dimercaptobenzaldehyde, dimercaptonaphthalene, trimercaptobenzoic acid and related materials can be used to separate molybdenum from tungsten in aqueous solution in the manner described by this invention for 3,4-dimercaptotoluene as long as the two mercapto groups of the compound are in adjacent (or ortho) positions to each other. Ortho means—a benzene derivative containing two substitution radicals in neighboring positions (see Hackh's Chemical Dictionary, Fourth Edition, McGraw-Hill). The 3,4-dimercaptotoluene is an especially preferred extractant because of its convenient commercial availability.

The 3,4-dimercaptotoluene is also known as dithiol and has been used as an analytical reagent for the colorimetric determination of both molybdenum and tungsten at very high acid concentrations, that is, at very low pH. The negatively charged molybdate or tungstate ions do not exist in strongly acidic solutions. In such systems, the prevalent ionic species are the positively charged molybdenyl or tungstenyl ions. Consequently, the complexes formed in acid solutions are different than those which are formed between molybdate or tungstate anions and 3,4-dimercaptotoluene in alkaline solutions. Thus, at low pH the maximum absorbance of the molybdenum-dithiol complex is at approximately 670 nm and that of the tungsten-dithiol complex is at approximately 630 nm. At pH of about 9.5, the molybdenum-dithiol complex has absorption peaks at about 303 and about 340 nm and virtually no absorption at about 670 nm. As indicated, the tungsten ion does not appear to form a complex.

The reaction between the molybdate ion and the 3,4-dimercaptotoluene can be represented by the following equation:

$$MoO_4^{--} + H_2L \rightleftharpoons MoO_2(OH)_2L^{--}$$

where $H_2L$ represents the ligand 3,4-dimercaptotoluene. The resulting molybdenum-dithiol complex is negatively charged and, therefore, its extraction into an organic phase would be facilitated by the presence of a positively charged counterion in the extracting medium. Such an extraction constitutes a liquid ion exchange.

Typically, the extracting medium can consist of an organic solvent in which is dissolved a counterion or a polar solvent without a counterion and a mercaptoaromatic complexing agent which has two mercapto groups at ortho positions to each other.

The organic solvent used with a counterion can be acetyl acetone, alkyl benzenes, benzene, chloroform, iso-octane, kerosene, pyridine, or tetrahydrofuran. The counterion used is of the quaternary alkyl ammonium chloride species such as methyl trialkyl ammonium chloride, more specifically, Adogen 464, a commercial monomethyl trialkyl ammonium chloride, or Aliquat 336, another commercial product of similar composition.

The preferred solvents are the two commercial solvents SC #150 and XT solvent of the alkyl benzene species because some of the others, such as benzene or chloroform, are objectionable for health reasons while tetrahydrofuran and acetyl acetone are partly water-miscible.

The polar solvents which can be used without a counterion are: acetophenone, acetyl acetone, aniline, 3-ethyl pyridine, isophorone, 3,4-lutidine, pyridine, quinaldine, or quinoline with 3-ethyl pyridine being the preferred polar solvent.

The concentration of the molybdenum values range from about 0.001 Molar to about 0.10 Molar and, more typically, between about 0.01 Molar to about 0.02 Molar, and the contact time is effective between about 5 minutes to about 120 minutes. The molar ratio of the complexing agent, counterion and molybdenum values is effective between the range of about 2:2:1 to about 10:10:1 and maximizes at about 10:10:1. When the extraction is done without a counterion, the molar ratio of the complexing agent and molybdenum values is about 10:1.

It is found that alkanol modifiers having from 6 to 9 carbon atoms such as heptanol or octanol are beneficial in that they help solubilize the components of the extractant, thus affording better interfacial contact between the aqueous and organic phases. It also prevents the formation of an objectionable third phase in the system. Either of these long chain alcohols may be used effectively. Decanol has also been tried but it results in lower separation factors. The range of useful modifier concentration is 5-50 v/o with the 10-20 v/o being the preferred one. Also the addition of a small amount of $Na_2S_2O_5$ is thought to prevent oxidation of the complexing agent.

During the extraction process, it is found that the molybdenum is preferentially extracted into the organic phase while the tungsten remains in the aqueous phase. The concentration of molybdenum relative to the tungsten in the organic phase is enriched in a single separation step by a factor of approximately 10 or better compared to that of the original aqueous solution. The extraction of molybdenum from an aqueous solution at a pH of about 9.5 is advantageous because it is the same as the actual pH of the processing stream which provides a clear technical and economic advantage.

The presence of the extracted molybdenum impurity in a liquid phase is another distinct advantage of this invention because the molybdenum as well as any coextracted tungsten values can be readily recovered by a known, widely used, single step process such as stripping with sodium or ammonium hydroxide. After recovery of the molybdenum and/or tungsten values, the liquid organic phase can be recycled back to the main process stream for additional extractions. In general, it is much easier to handle industrial liquid waste streams than semi-solid or solid wastes, particularly in a hydrometallurgical process such as the one used in treating tungsten ore or tungsten ore concentrates.

To more fully illustrate the invention, the following examples are presented. All parts, proportions and percentages are by weight unless otherwise indicated.

EXAMPLE 1

20 cc of an aqueous solution of 0.75 M sodium tungstate and 0.01 M sodium molybdate (these concentrations are typical of those found in a process stream resulting from the digestion of tungsten ore or tungsten ore concentrates with sodium hydroxide), the pH of which is adjusted to a value of 9.5, are shaken in a separatory funnel for 30 minutes on a wrist shaker with 20 cc of iso-octane containing 2 g of Adogen 464 and 0.1 g of 3,4-dimercaptotoluene. The aqueous and organic phases are separated and each is analyzed for tungsten and molybdenum. It is found that 40 mole percent (m/o) of the original molybdenum and 95 m/o of the original tungsten stays in the aqueous phase while 60 m/o of the molybdenum and only 5 m/o of the tungsten are extracted into the organic phase. Thus, the distribution ratio for Mo between the organic and aqueous phases is $$D_{Mo} = [Mo]_{org}/[Mo]_{aq} = 1.5$$

while that of W is $D_w = 0.05$ in this system.

EXAMPLE 2

The same experiment as in Example 1 is run except that the aqueous phase contains twice the amount of sodium molybdate, viz. 0.02 M. Again it is found that the aqueous phase contains 40 m/o of the original molybdenum and 95 m/o of the original tungsten while the organic phase contains the remaining 60 m/o of molybdenum and 5 m/o of tungsten. Thus, the extraction efficiency is not affected by doubling the molybdenum concentration.

EXAMPLE 3

The same experiment as in Example 2 is run except that only half the volume, viz. 10 cc of the organic phase is used. As expected, the amount of molybdenum extracted into the organic phase is lower, 40 m/o of the original concentration. 5 m/o of W co-extracts into the organic phase.

EXAMPLE 4

The same experiment as in Example 2 is run except that the volume of the organic phase used in the extraction is doubled to 40 cc. This increases the amount of molybdenum extracted into the organic phase to 72 m/o of the original concentration, while the amount of W extracted also increases to 11 m/o.

EXAMPLE 5

The pH of a solution containing 0.02 M/l of Mo and 0.75 M/l of W is adjusted to a value of 9.5. The 3,4-dimercaptotoluene (DMT) ligand is then dissolved in this solution in the amount of 0.04 M/l so that the molar ratio of DMT to Mo will be 2:1. An equimolar amount of tricaprylyl methylammonium chloride (Aliquat 336), i.e., 0.04 M/l, is dissolved in one of the organic solvents listed in Table I. Equal volumes of the aqueous and organic phases are contacted for ½ hour. The two phases were separated by settling for one hour and samples of the aqueous and organic phases were analyzed for W and Mo. The results are given in Table I. The data show that the efficiency of the separation of Mo from W is affected by the solvent used in the organic phase.

TABLE I
EFFECT OF SOLVENT ON Mo/W SEPARATION

| Solvent | $D_{Mo}^{(1)}$ | $D_W^{(2)}$ | $\beta^{(3)}$ |
|---|---|---|---|
| Iso-octane | 0.58 | 0.013 | 45 |
| Benzene | 1.0 | 0.0037 | 270 |
| Tetrahydrofuran | 0.79 | 0.0073 | 108 |
| Acetyl Acetone | 1.4 | 0.027 | 52 |
| Chloroform | 0.92 | 0.017 | 54 |
| Pyridine | 1.0 | 0.05 | 20 |
| Kerosene | 0.094 | 0.019 | 4.9 |
| SC #150 Solvent[4] | 0.70 | 0.020 | 35 |
| Solvent XT[5] | 0.91 | 0.017 | 53 |

$^{(1)}D_{Mo} = \dfrac{[Mo]_O}{[Mo]_A} = \dfrac{\text{concentration of Mo in the organic phase}}{\text{concentration of Mo in the aqueous phase}}$ distribution coefficient of Mo $^{(2)}D_W = \dfrac{[W]_O}{[W]_A} = \dfrac{\text{concentration of W in the organic phase}}{\text{concentration of W in the aqueous phase}}$ distribution coefficient of W $^{(3)}\beta = \dfrac{D_{Mo}}{D_W}$ — separation factor

[4]SC #150 - commercial solvent blend consisting of aromatic compounds containing more than 8 carbons
[5]Solvent XT - commercial blend of toluene and xylenes

EXAMPLE 6

In order to establish the effect of various components of the extraction system, viz. complexing agent, counterion and solvent, portions of the stock aqueous solution of 0.02 M/l Mo and 0.75 M/l W with a pH of 9.5 are contacted in the absence and presence of the DMT with various organic solvents in the presence or absence of counterion. The experimental conditions are the same as Example 5. The composition of the system and the results are presented in Table II. The data demonstrate that in non-polar solvents, both the ligand and the counterion are necessary to achieve effective separation of the Mo from W confirming the postulated mechanism of liquid ion exchange. The separation is not achieved (separation factors of less than 10 are insignificant) by the ligand alone, or by the counterion alone, or by the solvent, but rather by the synergistic effect of all three components of the extractant system. This in spite of the fact that in this series of experiments, one of the components of the system, the DMT ligand, was dissolved in the aqueous rather than organic phase.

TABLE II
EFFECT OF SYSTEM COMPOSITION ON Mo/W SEPARATION

| Solvent | Ligand | : | Counterion | : | Mo | $D_{Mo}$ | $D_W$ | $\beta$ |
|---|---|---|---|---|---|---|---|---|
| Iso-octane | 0 | : | 0 | : | 1 | 0.02 | 0.015 | 1.3 |
| Iso-octane | 0 | : | 2 | : | 1 | 0.045 | 0.021 | 2.2 |
| Iso-octane | 2 | : | 0 | : | 1 | 0.04 | 0.11 | 0.4 |
| Iso-octane | 2 | : | 2 | : | 1 | 0.84 | 0.04 | 21 |
| Chloroform | 0 | : | 0 | : | 1 | 0.010 | 0.0036 | 2.8 |
| Chloroform | 0 | : | 2 | : | 1 | 0.017 | 0.0055 | 3.1 |
| Chloroform | 2 | : | 0 | : | 1 | 0.020 | 0.0078 | 2.8 |
| Chloroform | 2 | : | 2 | : | 1 | 0.79 | 0.01 | 79 |
| Benzene | 0 | : | 2 | : | 1 | 0.06 | 0.035 | 1.7 |
| Benzene | 2 | : | 0 | : | 1 | 0.16 | 0.13 | 1.2 |
| Benzene | 2 | : | 2 | : | 1 | 1.0 | 0.0037 | 270 |
| SC #150 | 0 | : | 2 | : | 1 | 0.030 | 0.017 | 1.8 |
| SC #150 | 2 | : | 0 | : | 1 | 0.049 | 0.030 | 1.6 |
| SC #150 | 2 | : | 2 | : | 1 | 0.70 | 0.020 | 35 |
| Solvent XT | 0 | : | 2 | : | 1 | 0.30 | 0.045 | 6.7 |
| Solvent XT | 2 | : | 0 | : | 1 | 0.030 | 0.015 | 2.0 |
| Solvent XT | 2 | : | 2 | : | 1 | 0.91 | 0.017 | 53 |

EXAMPLE 7

The data in Table III demonstrate that there is no real difference in Mo/W separation between dissolving the ligand in the aqueous or in the organic phase. While many of the early experiments were made with the DMT in the aqueous phase, it would be preferable in industrial applications to have all the organic components together in one phase so as to facilitate the formulation and handling of the extractant. Table III also presents the results of a comparison between two commercially available grades of the quaternary amine tricaprylyl methyl ammonium chloride; namely, Aliquat 336 (manufactured by the Minerals Industry Division of Henkel Corporation, 4620 W. 77th Street, Minneapolis, MN 55435) and Adogen 464 (manufactured by the Sherex Chemical Company, Inc., P. O. Box 646, Dublin, OH 43017). Either of these materials can be used with comparable effectiveness as a counterion in this process. The molar ratio of ligand to counterion to molybdenum was maintained at 2:2:1 in this set of experiments.

TABLE III
FORMULATION EFFECTS

| Solvent | Counterion | Phase DMT dissolved in | $D_{Mo}$ | $D_W$ | $\beta$ |
|---|---|---|---|---|---|
| Iso-octane | Adogen 464 | Organic | 0.39 | 0.012 | 32 |
| Iso-octane | Adogen 464 | Aqueous | 0.31 | 0.011 | 28 |
| Iso-octane | Aliquat 336 | Organic | 0.32 | 0.010 | 32 |
| Iso-octane | Aliquat 336 | Aqueous | 0.58 | 0.013 | 45 |
| Benzene | Aliquat 336 | Organic | 0.23 | 0.011 | 21 |
| Benzene | Aliquat 336 | Aqueous | 0.42 | 0.011 | 38 |
| SC #150 | Aliquat 336 | Organic | 0.77 | 0.021 | 36 |
| SC #150 | Aliquat 336 | Aqueous | 0.70 | 0.025 | 35 |
| Solvent XT | Aliquat 336 | Organic | 0.51 | 0.009 | 58 |
| Solvent XT | Aliquat 336 | Aqueous | 0.91 | 0.017 | 53 |

EXAMPLE 8

The effect of increasing counterion concentration at constant ligand concentration, of increasing ligand concentration at constant counterion concentration, and of increasing both ligand and counterion concentration while maintaining their ratio constant in various solvents was evaluated in a series of experiments, the results of which are tabulated in Table IV. In all experiments, the ligand is dissolved in the aqueous phase and Aliquat 336 is used as the counterion. At constant ligand and increasing counterion in the isooctane medium, the distribution ratio $D_{Mo}$ of molybdenum is increasing only slowly. This is so because all available complex is extracted and additional counterion serves really no useful purpose. It does extract some of the tungsten, the distribution ratio of which is increasing slightly and, therefore, the separation ratio remains fairly constant. An increase in the ligand concentration at constant counterior increases the $D_{Mo}$ substantially in the first step but then the increase is more gradual. The reason for this may be that while there is more complex in the aqueous phase to be extracted, there is no additional counterion to extract it with. The $D_W$ is increasing at a greater rate than $D_{Mo}$ at higher DMT concentrations reducing the $\beta$-value. An increase in both the ligand and counterion concentration while their molar ratio is maintained at 1:1 provides dramatic increases in the $\beta$. There is more complex formed in the aqueous phase and enough counterion to extract it into the organic phase. The data in iso-octane at the highest ligand and counterion concentration indicate that 95% of the Mo is extracted into the organic phase while only about 0.5% of the W is co-extracted. This is an excellent separation for a single step extraction in a 1:1 aqueous to organic phase ratio where the original molar ratio of Mo:W in the aqueous phase is 0.02:0.75. Excellent separation is also obtained in other solvent systems, such as tetrahydrofuran or the XT solvent. It is to be noted that a $D_{Mo}$ value exceeding 100 implies that more than 99% of the Mo values are extracted from the aqueous to the organic phase.

TABLE IV
EFFECT OF EXTRACTANT COMPOSITION ON Mo/W SEPARATION

| Solvent | Ligand | : | Counter-ion | : | Mo | $D_{Mo}$ | $D_W$ | $\beta$ |
|---|---|---|---|---|---|---|---|---|
| Iso-octane | 2 | : | 2 | : | 1 | 0.42 | 0.028 | 15 |
| Iso-octane | 2 | : | 4 | : | 1 | 0.60 | 0.034 | 18 |
| Iso-octane | 2 | : | 6 | : | 1 | 0.78 | 0.039 | 20 |
| Iso-octane | 2 | : | 10 | : | 1 | 0.71 | 0.060 | 12 |
| Iso-octane | 4 | : | 2 | : | 1 | 1.2 | 0.020 | 60 |
| Iso-octane | 6 | : | 2 | : | 1 | 1.5 | 0.045 | 33 |
| Iso-octane | 10 | : | 2 | : | 1 | 1.7 | 0.069 | 25 |
| Iso-octane | 4 | : | 4 | : | 1 | 1.7 | 0.047 | 36 |
| Iso-octane | 6 | : | 6 | : | 1 | 4.3 | 0.047 | 91 |
| Iso-octane | 10 | : | 10 | : | 1 | 16.6 | 0.004 | 4150 |
| Tetrahydrofuran | 2 | : | 2 | : | 1 | 0.29 | 0.023 | 13 |
| Tetrahydrofuran | 4 | : | 4 | : | 1 | 2.0 | 0.019 | 105 |
| Tetrahydrofuran | 6 | : | 6 | : | 1 | 44 | 0.029 | 1520 |
| Tetrahydrofuran | 10 | : | 10 | : | 1 | 135 | 0.023 | 5870 |
| SC #150 | 2 | : | 2 | : | 1 | 0.70 | 0.020 | 35 |
| SC #150 | 4 | : | 4 | : | 1 | 4.0 | 0.032 | 125 |
| SC #150 | 6 | : | 6 | : | 1 | 5.9 | 0.042 | 140 |
| SC #150 | 10 | : | 10 | : | 1 | 14.5 | 0.080 | 180 |
| Solvent XT | 2 | : | 2 | : | 1 | 0.91 | 0.017 | 53 |
| Solvent XT | 4 | : | 4 | : | 1 | 3.1 | 0.024 | 130 |
| Solvent XT | 6 | : | 6 | : | 1 | 12.7 | 0.021 | 600 |
| Solvent XT | 10 | : | 10 | : | 1 | 225 | 0.080 | 2810 |

EXAMPLE 9

The effect of contact time on the extraction characteristics is given in Table V. In these experiments, a solution containing 0.02 M/l of $MoO_4^{--}$ and 0.75 M/l of $WO_4^{--}$ is contacted for the indicated time interval with an organic phase consisting of 0.012 M/l of each DMT and Aliquat 336 (6:6:1 mole ratio) dissolved in 90 v/o XT solvent - 10 v/o heptanol. The data indicate that $D_{Mo}$ increases with contact time up to 30 minutes wile $D_W$ remains fairly constant so that the highest separation factor is observed at that time.

TABLE V
EFFECT OF CONTACT TIME ON Mo/W SEPARATION

| Contact Time (min) | $D_{Mo}$ | $D_W$ | $\beta$ |
|---|---|---|---|
| 5 | 5.9 | 0.014 | 420 |
| 10 | 6.9 | 0.019 | 370 |
| 20 | 7.2 | 0.019 | 380 |
| 30 | 11.6 | 0.012 | 930 |
| 60 | 6.6 | 0.011 | 600 |
| 120 | 5.8 | 0.015 | 380 |

EXAMPLE 10

The Mo values can be recovered from the organic phase by treating the organic extractant with alkaline reagents such as sodium hydroxide. This reverses the complexation reaction as the $DMT-MoO_4^{--}$ complex is not stable at high pH where it releases the molybdate ion back into the aqueous phase. Thus, the organic phase used in the extraction of Mo from a 0.02 M/l $MoO_4^{--} + 0.75$ M/l $WO_4^{--}$ aqueous solution and containing 0.017 M/l of Mo (indicating the extraction of 85% of the Mo present in the aqueous phase) is contacted for 30 minutes with a 0.1N NaOH solution. The slurry is settled for one hour and the two phases are separated and analyzed. The aqueous phase is found to contain 0.016 M/l of Mo indicating that 94.1% of the Mo is stripped from the organic phase. The organic phase was analyzed to contain 2.8% of the Mo values for a mass balance of 96.9%, an acceptable figure. Similar results are obtained by treating the organic extractant with more concentrated NaOH solutions or with other alkali reagents. At the same time, the small amounts of tungsten present in the organic extractant are also stripped by the identical mechanism.

EXAMPLE 11

Another way of separating Mo from W in aqueous solutions by using 3,4-dimercaptotoluene is by dissolving it in polar solvents or those with a high dielectric constant. In such cases, high separation factors are realized without the presence of a counterion (Table VI) and it is thought that the separation mode is that of solvent extraction rather than liquid ion exchange. In the series of experiments, the results of which are given in Table VI, the DMT was dissolved in the indicated solvent and then contacted with an aqueous solution of 0.02 M/l $MoO_4^{--}$ + 0.75 M/l $WO_4^{--}$ adjusted to a pH of 9.5. In the case of tetrahydrofuran (THF), a comparison was made between the presence and absence of counterion at four different molar ratios. The data show that although good separation is obtained in THF alone, much higher $\beta$-values are obtained when the Aliquat 336 counterion is present, particularly at higher molar ratios. Excellent separation factors are also observed using 3-ethyl pyridine, quinoline, 3,4-lutidine and isophorone as solvents.

TABLE VI
SEPARATION OF Mo FROM W BY SOLVENT EXTRACTION

| Solvent | Ligand | : | Counter-ion | : | Mo | $D_{Mo}$ | $D_W$ | $\beta$ |
|---|---|---|---|---|---|---|---|---|
| Tetrahydrofuran | 0 | : | 0 | : | 1 | 0.025 | 0.019 | 1.3 |
| Tetrahydrofuran | 0 | : | 2 | : | 1 | 0.050 | 0.028 | 1.8 |
| Tetrahydrofuran | 2 | : | 0 | : | 1 | 0.61 | 0.014 | 44 |
| Tetrahydrofuran | 2 | : | 2 | : | 1 | 0.79 | 0.0073 | 108 |
| Tetrahydrofuran | 4 | : | 0 | : | 1 | 1.6 | 0.017 | 91 |
| Tetrahydrofuran | 4 | : | 4 | : | 1 | 2.0 | 0.019 | 105 |
| Tetrahydrofuran | 6 | : | 0 | : | 1 | 8.8 | 0.030 | 290 |
| Tetrahydrofuran | 6 | : | 6 | : | 1 | 44 | 0.029 | 1520 |
| Tetrahydrofuran | 10 | : | 0 | : | 1 | 31 | 0.053 | 580 |
| Tetrahydrofuran | 10 | : | 10 | : | 1 | 135 | 0.023 | 5870 |
| Acetyl Acetone | 10 | : | 0 | : | 1 | 1.3 | 0.0056 | 230 |
| Acetophenone | 10 | : | 0 | : | 1 | 1.0 | 0.0083 | 120 |
| Pyridine | 10 | : | 0 | : | 1 | 1.8 | 0.012 | 150 |
| Aniline | 10 | : | 0 | : | 1 | 0.49 | 0.0014 | 350 |
| 3,4-Lutidine | 10 | : | 0 | : | 1 | 31.5 | 0.013 | 2400 |
| 3-Ethylpyridine | 10 | : | 0 | : | 1 | 135 | 0.018 | 7400 |
| Quinoline | 10 | : | 0 | : | 1 | 100 | 0.032 | 3100 |
| Quinaldine | 10 | : | 0 | : | 1 | 16 | 0.058 | 275 |
| Isophorone | 10 | : | 0 | : | 1 | 7.1 | 0.0034 | 2100 |

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for removing molybdenum values from an aqueous solution containing tungsten values and molybdenum values, said aqueous solution being at a pH greater than 8.5, said process comprising:
    contacting said aqueous solution with an extractant comprising
    a mercaptoaromatic complexing agent having two mercapto groups at ortho positions to each other, and
    an organic solvent;
    the contacting of the aqueous solution with the extractant taking place for a sufficient amount of time to extract a portion of said molybdenum values without extracting an appreciable portion of said tungsten values.

2. A process of claim 1 wherein said extractant further comprises:
    a counterion.

3. A process of claim 2 wherein said organic solvent is selected from the group consisting of acetyl acetone, alkyl benzenes, benzene, chloroform, iso-octane, kerosene, pyridine, tetrahydrofuran, and mixture thereof.

4. A process of claim 2 wherein said organic solvent is a mixture of alkyl benzenes.

5. A process of claim 2 wherein said counterion is selected from quaternary alkyl ammonium chlorides.

6. A process of claim 5 wherein said counterion is methyl trialkyl ammonium chloride.

7. A process of claim 2 wherein said complexing agent, said counterion, and said molybdenum values have a molar ratio between the range of about 2:2:1 to about 10:10:1.

8. A process of claim 7 wherein said molar ratio is about 10:10:1.

9. A process of claim 1 wherein the organic solvent of said extractant is a polar solvent.

10. A process of claim 9 wherein said polar solvent is selected from the group consisting of acetophenone, acetyl acetone, aniline, 3-ethylpyridine, isophorone, 3,4-lutidine, pyridine, quinaldine, quinoline, and mixtures thereof.

11. A process of claim 9 wherein said polar solvent is 3-ethylpyridine.

12. A process of claim 9 wherein said complexing agent and said molybdenum values have a molar ratio of about 10:1.

13. A process of claim 1 wherein said mercaptoaromatic complexing agent is selected from the group consisting of dimercaptobenzene, trimercaptobenzene, chloro-dimercaptobenzene, nitro-dimercaptobenzene, dimercaptobenzoic acid, dimercaptobenzaldehyde, dimercaptonaphthalene, trimercaptobenzoic acid, 3,4-dimercaptotoluene, and mixtures thereof.

14. A process of claim 1 wherein said mercaptoaromatic complexing agent is 3,4-dimercaptotoluene.

15. A process of claim 1 wherein said pH is about 9.5.

16. A process of claim 1 wherein said aqueous solution contains molybdenum values between the range of about 0.001 Molar to about 0.10 Molar.

17. A process of claim 1 wherein said molybdenum values are between the range of about 0.01 Molar to about 0.02 Molar.

18. A process of claim 1 wherein the contact time is between about 5 minutes to about 120 minutes.

* * * * *